(12) United States Patent
Schulz-Hanke

(10) Patent No.: US 10,619,766 B2
(45) Date of Patent: Apr. 14, 2020

(54) LINE FEEDTHROUGH FOR FEEDING LINES THROUGH A COMPONENT

(71) Applicant: HILTI AKTIENGESELLSCHAFT, Schaan (LI)

(72) Inventor: Wolfgang Schulz-Hanke, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 37 days.

(21) Appl. No.: 15/761,937

(22) PCT Filed: Sep. 27, 2016

(86) PCT No.: PCT/EP2016/072906
§ 371 (c)(1),
(2) Date: Mar. 21, 2018

(87) PCT Pub. No.: WO2017/055241
PCT Pub. Date: Apr. 6, 2017

(65) Prior Publication Data
US 2018/0259095 A1    Sep. 13, 2018

(30) Foreign Application Priority Data

Sep. 29, 2015    (EP) .................................... 15187323

(51) Int. Cl.
*F16L 5/04*    (2006.01)
*F16L 5/02*    (2006.01)
*H02G 3/08*    (2006.01)
*H02G 3/22*    (2006.01)

(52) U.S. Cl.
CPC ................. *F16L 5/025* (2013.01); *F16L 5/04* (2013.01); *H02G 3/083* (2013.01); *H02G 3/22* (2013.01)

(58) Field of Classification Search
CPC . F16L 5/025; F16L 5/04; H02G 3/083; H02G 3/22
See application file for complete search history.

(56) References Cited

U.S. PATENT DOCUMENTS

| | | | |
|---|---|---|---|
| 3,806,625 A * | 4/1974 | Long ...................... | H01B 17/30 174/31 R |
| 4,331,338 A | 5/1982 | Caldwell et al. | |
| 5,548,934 A * | 8/1996 | Israelson ................ | A62C 2/065 52/1 |

(Continued)

FOREIGN PATENT DOCUMENTS

| | | |
|---|---|---|
| DE | 10 2006 000 184 A1 | 10/2007 |
| DE | 10 2008 000 420 A1 | 9/2009 |

(Continued)

*Primary Examiner* — Gilbert Y Lee
(74) *Attorney, Agent, or Firm* — Grüneberg and Myers PLLC

(57) ABSTRACT

A line penetration for routing a line through a building part, which has a closure plate for covering a passage opening in the building part and a fastening arrangement. The closure plate has at least one line opening for receiving the line. The fastening arrangement can be fastened to the building part, for holding the closure plate, so that a relative displacement of the closure plate along a surface direction of the closure plate is permitted and the closure plate is fixed perpendicular to the surface direction of the closure plate.

18 Claims, 2 Drawing Sheets

(56) References Cited

U.S. PATENT DOCUMENTS

2008/0265525 A1* 10/2008 Cummings .............. F16L 5/04
                                                          277/606
2008/0265526 A1* 10/2008 Cummings .............. A62C 2/06
                                                          277/606
2012/0096673 A1    4/2012 Retter

FOREIGN PATENT DOCUMENTS

| EP | 1987863 A1 | 11/2008 |
| EP | 1988319 A1 | 11/2008 |
| WO | WO 96/07453 A1 | 3/1996 |

* cited by examiner

LINE FEEDTHROUGH FOR FEEDING LINES THROUGH A COMPONENT

This application is a National Stage entry under § 371 of International Application No. PCT/EP2016/072906, filed on Sep. 27, 2016, and which claims the benefit of European Patent Application No. 15187323.9, filed on Sep. 29, 2015.

TECHNICAL FIELD

The invention relates to a line penetration for routing a line through a building part, especially through a building wall or building ceiling. In particular, the present invention relates in general to fire-protection measures for routing lines through a building part.

TECHNICAL BACKGROUND

In buildings and installations, lines routed through a building part, such as a wall or a ceiling, for example, must satisfy fire-protection requirements. For example, one essential requirement is that combustion gases or even fire must not be permitted to penetrate the building part, i.e. must not be permitted to travel from one room in a building to the next.

For this reason, it is customary, in the case of line penetrations through walls, to fill the intermediate space situated between the line and an inner wall of a passage opening with a flexible and rigid filling material, such as with mortar, PU bricks, acrylate sealing compound, mineral wool, especially in combination with spray coatings and the like.

In the fire situation, stresses may be caused by heat generation, in turn leading to strong mechanical forces between the wall and the line routed through it. Thereby a relative offset may develop between the line and the wall. In particular, considerable displacements between the line and the wall may also occur during earthquakes. Since the line is usually permanently bonded to the filling material, the filling material may detach, tear or break due to the occurring stresses. In particular, a relative displacement of the line perpendicular to the wall may lead to partial or complete detachment of the filling material from the line and/or from the passage opening or to tearing of the filling material. Due to the resulting cracks and gaps, the required impermeability to gas is impaired, and so combustion gases and fire are able to overcome the previously gas-tight passage opening. Therefore the previous approach of simply filling the intermediate space between the line and the inner wall of the passage opening with a filling material is not optimum.

Cable boxes common on the market are intended to route the line through a combination of solid plastic and sealing material, although thereby the relative mobility of the line is considerably restricted, and so, in the event of violent shaking, damage to the cable box is almost unavoidable and impermeability to gas is no longer assured.

Furthermore, intumescent lamellas may be provided, which indeed ensure improved mobility of the routed line but do not have adequate impermeability to smoke gas.

A further approach is known, for example, from DE 10 2008 000 420 A1, in which a line penetration is disclosed that has a closed space for routing a line. An insert of intumescent material and at least one sealing element of an elastic material are provided in the housing of the line penetration, in order to achieve sealing in the fire situation.

A line penetration for routing lines through a building part is known from DE 10 2006 000 184 A1. The line penetration has a jacket tube and a base part, which is attached to a first axial end of the jacket tube and comprises a receiving space, surrounding a penetration, for a firestop material. Furthermore, an annular membrane-like sealing element is disposed at the first axial end of the jacket tube. A further membrane-like sealing element is disposed at the second axial end of the jacket tube, in order to seal the line penetration.

It is one object of the present invention to provide a line penetration with which a line can be routed through a building part, for example a wall or a ceiling, so that this is impermeable to smoke gases in a fire situation. Furthermore, it is intended to ensure tolerance to shaking and relative displacements between the line and the building part, so that the impermeability of the line penetration is not impaired even after a relative displacement.

DISCLOSURE OF THE INVENTION

This object is solved by the line penetration according to claim 1 as well as by a line-penetration arrangement according to the secondary claim.

Further configurations are specified in the dependent claims.

As used within the scope of the present invention, the singular forms "one", "a" and "an" also include the corresponding plural forms, unless something different can be inferred unambiguously from the relationship. Thus, for example, the term "one" is intended to mean "one or more" or "at least one", unless otherwise indicated.

The terms "exhibit", "with" and "have" are intended to be inclusive and mean that elements other than those cited may also be meant.

According to a first aspect, a line penetration is provided for routing a line through a building part, especially a wall or a ceiling of a building. The line penetration comprises:
  a closure plate, especially planar, for covering a passage opening in the building part, wherein the closure plate has at least one line opening for receiving a line;
  a fastening arrangement, which can be fastened to the building part, for holding the closure plate on the passage opening, so that a relative displacement of the closure plate along a surface direction, especially in all surface directions of the closure plate is permitted and the closure plate is fixed perpendicular to the surface direction of the closure plate.

One idea for the above line penetration consists in providing a gas-tight closure for a passage opening through a building part, in which a relative movement between a routed-through line and the passage opening can be absorbed and at the same time the impermeability to gas is maintained. This is achieved by the fact that the closure plate is held by the fastening arrangement such that it can move along directions parallel to its surface direction but is held securely or immovably in a direction perpendicular thereto.

Furthermore, the line opening may be equipped with a sliding device, so that the line is guided slidingly and gas-tightly through the line opening.

Thereby, in the event of a relative movement between a routed-through line and the passage opening, the sliding device is able to absorb the relative offset in the direction of an axial extent of the line, i.e. perpendicular to the surface direction of the closure plate, so that corresponding admission of force to the line penetration can be suppressed. Thereby it is possible to prevent a relative movement of the line along the direction of its extent from leading to damage or to a gas leak of the line penetration.

In particular, the sliding device may have a coil of sliding film and/or a lubricant.

According to one embodiment, the closure plate may be equipped at its rims or at it its rim regions with a lubricating and sealing means, in order to permit sealing between the closure plate and a region of the building part as well as sliding of the closure plate.

It may be provided that the closure plate is circumferentially bent over at its rims. This permits even better impermeability to gas between the closure plate and the building part.

Furthermore, the fastening arrangement may comprise at least one fastening device, wherein the fastening device has a fixation pin with a shank and a fixation head, wherein the shank protrudes through a fastening opening in the closure plate and the fixation head overlaps the fixation opening, in order to hold the closure plate. This represents a simple configuration of the fastening device.

It may be further provided that the cross section of the shank is smaller than the cross section of the fastening opening. Thereby it is possible to define the displacement path permitted between line and closure element.

According to one embodiment, the fixation head may have a size such that it holds the closure plate perpendicular to the surface direction of the closure plate even when the shank is disposed on a rim of the fastening opening.

Furthermore, the fixation head may be cruciate, circular, oval, polygonal or rectangular. Alternatively or additionally, the fastening opening may have a round, oval, rectangular or polygonal cross section.

According to a further aspect, a line-penetration arrangement is provided comprising:
- a building part with a passage opening;
- the above line penetration on one side of the building part;
- wherein the fastening arrangement is permanently joined to the building part.

According to a further aspect, a line-penetration arrangement is provided comprising:
- a building part with a passage opening;
- several of the above line penetrations on several sides of the building part;

wherein the fastening arrangement is permanently joined to the building part. By the fact that the fire-protection plate bears flatly on the surface regions surrounding the opening in the building part, the building opening is sealed against the passage of combustion gases in the fire situation.

Furthermore, an intermediate space may be provided as a cavity between the closure plates of the several line penetrations or filled at least partly with a fire-retardant or incombustible filling material.

According to one embodiment, the fastening openings may be so disposed in the closure plate that a displacement of the closure plate within movement limits defined by the positioning of the shanks of the fixation pins in the fastening openings does not cause any of the fastening openings to reach into the region of the passage opening.

BRIEF DESCRIPTION OF THE DRAWINGS

Embodiments will be explained in more detail hereinafter on the basis of the attached drawings, wherein.

DESCRIPTION OF EMBODIMENTS

Figure 1:
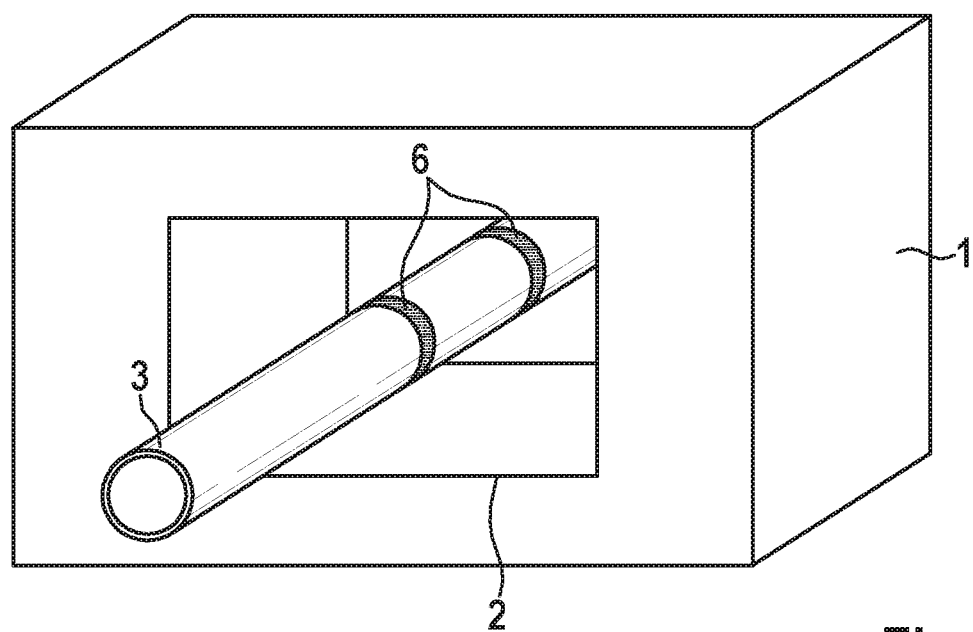
FIG. 1 shows a diagram of a wall portion with a passage opening and a line routed through it.

FIG. 1 shows a perspective diagram of a portion of a wall 1 (or of another building part) with a passage opening 2 passing through the width of wall 1. A line 3 is routed through passage opening 2. Line 3 may be a cable, a cable duct, a pipe, a cable route, a ventilation pipe, a ventilation damper or a similar component.

Figure 2:
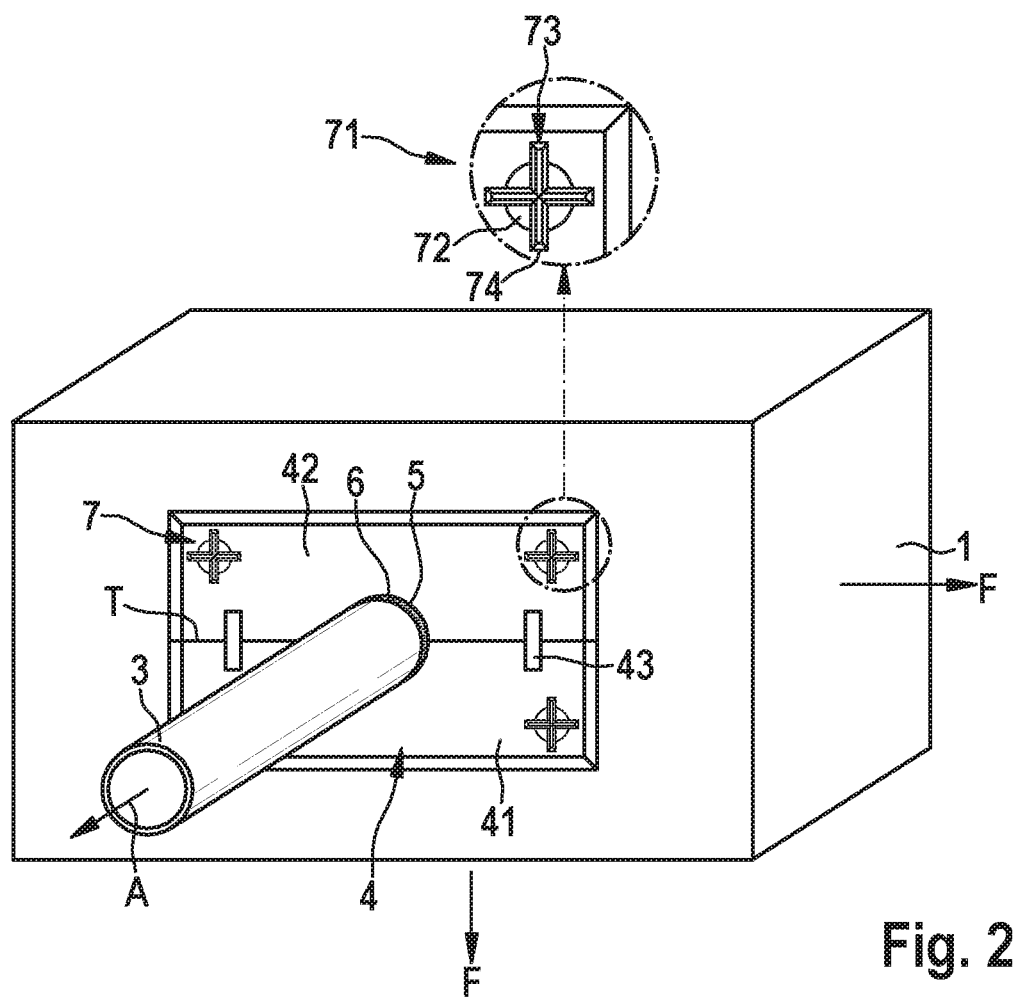
FIG. 2 shows a perspective diagram of a wall portion equipped with the line penetration.

As is evident in the schematic diagram of FIG. 2, a one-piece or multi-piece closure plate 4, which covers the full area of passage opening 2 and bears on the wall regions surrounding passage opening 2, may be provided for closing passage opening 2. Thereby sealing of passage opening 2 against combustion gases and the like is achieved.

Closure plate 4 has a line opening 5, which serves to receive and guide line 3. For this purpose, line opening 5 has a cross section that substantially corresponds to the cross section of line 3 and is only slightly larger than this, so that it offers no noteworthy access for combustion gases.

Between the shell surface of line 3 and the inside edge of line opening 5, it is possible to provide a sliding device 6 in the form of a coil of sliding film or of a lubricant, in order to permit sliding of line 3 in the direction of axial extent A of the line or in the ideal case in the direction perpendicular to the face of fire-protection plate 4. Thereby forces and relative movements in axial direction A or perpendicular to the face of the fire-protection plate or perpendicular to the outer face of wall 1, in the event of shaking due to an earthquake or the like, cannot be transmitted from line 3 to fire-protection plate 4. Furthermore, sliding device 6 contributes improved impermeability to gas between line 3 and line opening 5 of closure plate 4.

Closure plate 4 may be made of a flame-resistant or incombustible material, such as filled polyurethane plates, composite materials, e.g. in combination with aluminum or the like.

Closure plate 4 may be constructed in one piece. For simplicity of assembly, however, closure place 2 may also be constructed in multiple pieces with closure-plate parts 41 and 42. A parting line T between two of the closure-plate parts 41, 42 of closure plate 4 extends through line opening 5 in such a way that line opening 5 is formed by closure-plate parts 41, 42, and so closure-plate parts 41, 42 are disposed around line 3. The individual closure-plate parts 41, 42 may then be joined to one another by means of an adhesive or of a joining element 43, so that, even during shaking, caused by an earthquake, for example, these themselves are held against one another, in order to be able to guide line 3 slidingly in line opening 5. The individual closure-plate parts may be additionally modified to have fire-protection capabilities.

Closure plate 4 is equipped with a fastening arrangement 7, which holds closure plate 4 against wall 1, so that the rims or the rim regions of closure plate 4 bear on the regions of wall 1 surrounding passage opening 2. Thereby passage opening 2 is closed impermeably by closure plate 4.

Furthermore, closure plate 4 bears on the regions of wall 1 surrounding passage opening 2 in such a way that, if forces act between closure plate 4 and line 3 transverse (perpendicular) to axial direction A or in surface direction F of wall 1 displacement of closure plate 4 over passage opening 2 is permitted without alteration of the geometry of line opening 5 for receiving line 3 or without exertion of noteworthy forces on line 3.

In order to obtain improved impermeability to gas and sliding ability between closure plate 4 and wall 1, closure plate 4 may be equipped at its rims or its rim regions on the side facing wall 1 with a lubricating and sealing means 8, which seals any access to passage opening 2 between wall 1 and closure plate 4 and at the same time permits movement with less friction of closure plate 4 in surface direction of the wall. Thereby it is ensured in improved manner that the smallest possible forces are transmitted from closure plate 4 to line 3. The lubricating and sealing means may if necessary be mixed with at least one fire-protection additive and/or modified in a manner relevant to fire protection.

Alternatively or additionally, closure plate 4 may be bent over at its rims in the direction of the wall, so that closure plate 3 bears on wall 1 with its rims surrounding passage opening 2. Thereby it is possible to achieve improved impermeability between closure plate 4 and wall 1 and to reduce the surface region for application of lubricating and sealing means 8.

In the illustrated exemplary embodiment, fastening arrangement 7 is provided by means of fastening devices 71. Fastening devices 71 are designed to permit movement in surface direction F of wall 1 and to hold closure plate 4 against movement in axial direction A or perpendicular to surface direction F of closure plate 4 or of wall 1.

In particular, closure plate 4 may be preferably constructed with rectangular shape or else other geometric shapes, and one or more fastening devices 71 may be disposed in its rim region, so that, during attachment of closure plate 4 over passage opening 2, this can be fastened to the regions of wall 1 surrounding passage opening 2. Fastening devices 71 are therefore disposed in such a way that they bear on closure plate 4 mounted on passage opening 2 outside the region of passage opening 2, so that anchoring of fastening devices 71 in wall 1 is possible.

Fastening device 71 comprises a fastening opening 72 in closure plate 4 and a fixation pin 73 to be anchored in the wall. Fixation pin 73 has a much smaller cross section in the region of its shank 75 than does fastening opening 72, so that movement of fire-protection plate 4 transverse to the direction of extent of the fixation pins is possible. Fixation pin 73 is equipped with a fixation head 74, which overlaps fastening opening 72 in closure plate 4 on the side facing away from the wall. By virtue of fixation head 74, closure plate 4 is held against the wall even if this moves laterally relative to fixation pin 73 anchored in the wall.

Fastening openings 72 may be so disposed in closure plate 4 that movement limits defined by the positioning of the shanks of fixation pins 72 in the fastening openings do not cause any of the fastening openings 72 to reach into the region of passage opening 2.

Fixation heads 74 may have cruciate, circular, rectangular or grid-like shape and extend completely or partly over fastening opening 72. In particular, fixation head 74 has a size in the direction transverse to shank 75 of fixation pin 73 that is sufficient to hold closure plate 4 regardless of the position of shank 75 in fastening opening 72.

Preferably, during first assembly, shanks 75 of fixation pins 73 are disposed such that they are situated centrally in fastening openings 73 of closure plate 4 when closure plate 4 is placed on passage opening 2 centrally or with adequate movement limits in all surface directions of wall 1. Thereby it may be ensured that a lateral offset of closure plate 4 relative to fixation pins 73 or relative to passage opening 2 is possible to the same extent in every direction.

By virtue of fastening arrangement 7, it is possible to absorb even lateral movements between wall 1 and line 3 due to the mobility of closure plate 4 along wall 1 or over passage opening 2. The possible displacement path that can be absorbed or compensated for in the event, for example, of an earthquake, may be defined by choosing adequate cross-sectional areas of fastening openings 72 relative to the cross sections of shanks 75 of fixation pins 73. By the fact that closure plate 4 is not buckled or warped during such a displacement, it is able to absorb extremely rapid movements without suffering permanent compression or elongation damage, which could lead to gas leaks.

Fixation head 74 may be equipped with a fire-protection coating, which ensures that fixation pins 72 do not soften due to heat during a fire and thereby jeopardize the fastening of closure plate 4.

Figure 3:
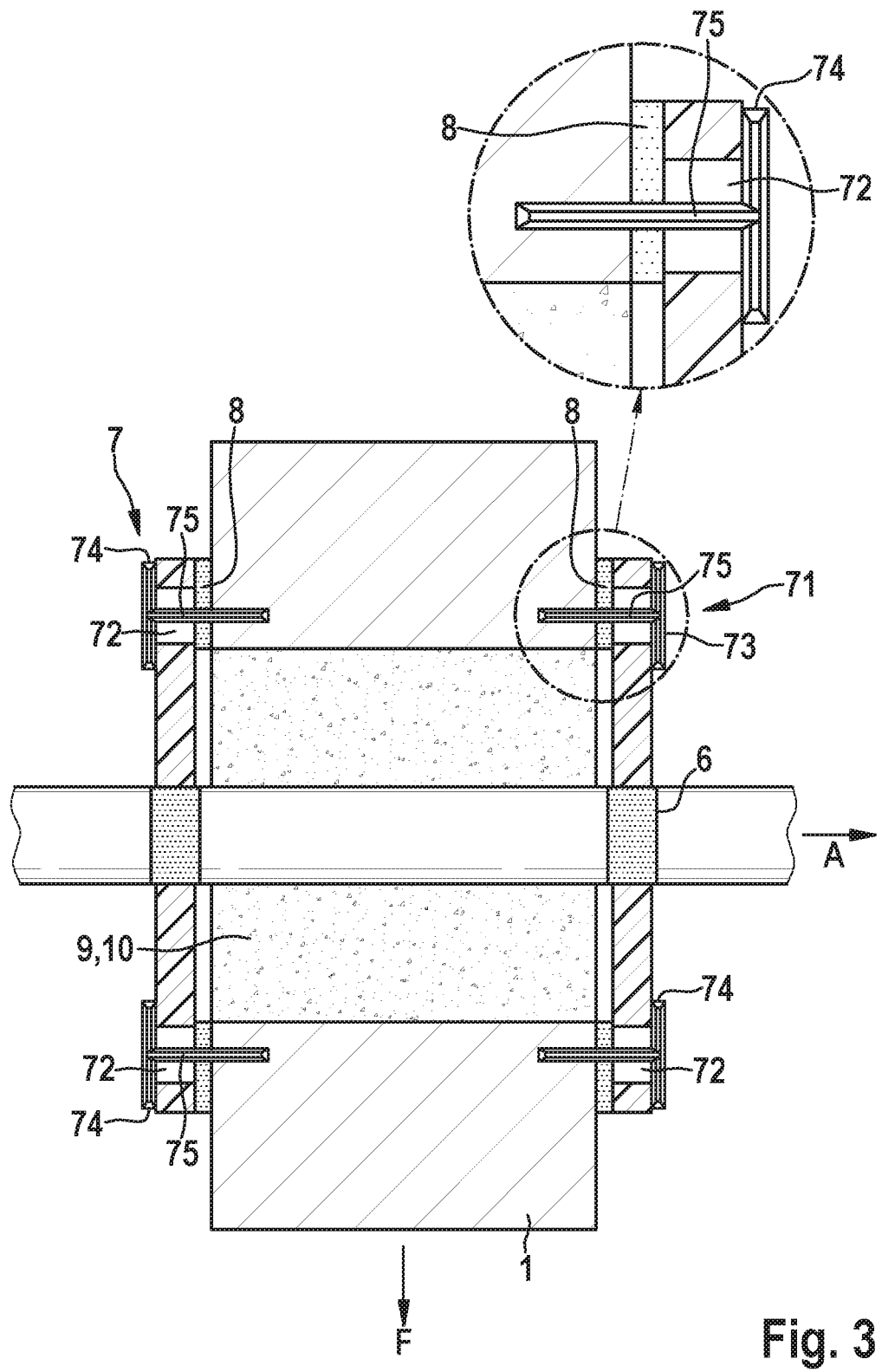
FIG. 3 shows a cross-sectional diagram through the wall opening with a line penetration having fire-protection plates on both sides of the wall.

FIG. 3 presents a cross-sectional diagram through a line-penetration arrangement, in which a passage opening 2 through wall 1 is closed on both sides by one of the line-penetrations described hereinabove. Cavity 9 formed thereby in wall 1 between line 3 and the inside wall of passage opening 2 may be left unfilled or may be filled in conventional manner with an incombustible or fire-retardant filling material 10, especially a nonflammable or flame-resistant mortar, acrylate sealing means or mineral wool, especially in combination with nonflammable spray coatings.

The invention claimed is:

1. A line penetration for routing a line through a building part, the line penetration comprising:
   a closure plate for covering a passage opening in the building part, wherein the closure plate has at least one line opening for receiving the line;
   a fastening arrangement to be fastened to the building part while holding the closure plate over the passage opening, the fastening arrangement to allow the closure plate to move along a surface direction of the closure plate and to contact and apply a holding force against the closure plate to fix the closure plate without movement in a direction perpendicular to the surface direction of the closure plate.

2. The line penetration according to claim 1, wherein the line opening is equipped with a sliding device, so that the line is guided slidingly and gas-tightly through the line opening.

3. The line penetration according to claim 2, wherein the sliding device has a coil of sliding film and/or a lubricant.

4. The line penetration according to claim 1, wherein the closure plate is equipped at rims thereof, or at rim regions thereof, with a lubricant and sealant, in order to permit sealing between the closure plate and a region of the building part as well as sliding of the closure plate.

5. The line penetration according to claim 1, wherein the closure plate is circumferentially bent over at its rims.

6. The line penetration according to claim 1, wherein the fastening arrangement comprises at least one fastening device, wherein the fastening device has a fixation pin with a shank and a fixation head, wherein the shank protrudes through a fastening opening in the closure plate and the fixation head overlaps the fixation opening, in order to hold the closure plate.

7. The line penetration according to claim 6, Therein a cross section of the shank is smaller than a cross section of the fastening opening.

8. The line penetration according to claim 6, wherein the fixation head has a size such that it holds the closure plate perpendicular to the surface direction of the closure plate even when the shank is disposed on a rim of the fastening opening.

9. The line penetration according to claim 6, wherein the fixation head is cruciate, circular, oval, polygonal or rectangular, and/or wherein the fastening opening has a round, oval, rectangular or polygonal cross section.

10. A line-penetration arrangement, comprising:
a building part that comprises a passage opening;
a line penetration according to claim 1 on one side of the building part;
wherein the fastening arrangement is permanently joined to the building part.

11. The line-penetration arrangement according to claim 10, wherein the fastening openings are so disposed in the closure plate that a displacement of the closure plate within movement limits defined by the positioning of the shanks of the fixation pins in the fastening openings does not cause any of the fastening openings to reach into the region of the passage opening.

12. A line-penetration arrangement, comprising:
a building part that comprises a passage opening;
several line penetrations according to claim 1 on several sides of the building part;
wherein the fastening arrangement is permanently joined to the building part.

13. The line-penetration arrangement according to claim 12, wherein an intermediate space is provided as a cavity between the closure plates of the several line penetrations or is filled at least partly with a fire-retardant or incombustible filling material.

14. A line penetration apparatus, comprising:
at least one plate including a passage aligned with an opening in a building part; and
a fastener to hold the at least one plate over the opening in the building part,
wherein the fastener is coupled to the building part and is to allow the at least one plate to move in a first direction and to be fixed without movement in a second direction crossing the first direction and wherein the opening in the building part has a size sufficient to receive a line passing through the opening in the building part.

15. The line penetration apparatus of claim 14, wherein:
the at least one plate includes an opening to receive the fastener, and
a portion of the fastener extending into the opening of the at least one plate has a size sufficient to allow the at least one plate to move in the second direction and to be fixed without movement in the first direction.

16. The line penetration apparatus of claim 14, further comprising:
a slider arranged in the passage of the at least one plate, wherein the slider is to allow the line to slide through the passage of the at least one plate when a force is applied.

17. The line penetration apparatus of claim 14, wherein:
the at least one plate includes a rim adjacent the passage, and
the rim is circumferentially bent.

18. The line penetration apparatus of claim 14, further comprising: a seal located between the at least one plate and the building part.

* * * * *